US006839850B1

(12) United States Patent
Campbell et al.

(10) Patent No.: US 6,839,850 B1
(45) Date of Patent: Jan. 4, 2005

(54) METHOD AND SYSTEM FOR DETECTING INTRUSION INTO AND MISUSE OF A DATA PROCESSING SYSTEM

(75) Inventors: Wayne A. Campbell, Plattsmouth, NE (US); Jeffrey H. Walker, Papillon, NE (US)

(73) Assignee: PRC, Inc., McLean, VA (US)

( * ) Notice: Subject to any disclaimer, the term of this patent is extended or adjusted under 35 U.S.C. 154(b) by 0 days.

(21) Appl. No.: 09/262,027

(22) Filed: Mar. 4, 1999

(51) Int. Cl.[7] ................... G06F 11/30; G06F 15/173; G06F 15/16
(52) U.S. Cl. .................. 713/201; 713/200; 709/223; 709/224; 709/226; 709/229
(58) Field of Search ............................. 713/200, 201; 709/223, 224, 226, 229

(56) References Cited

U.S. PATENT DOCUMENTS

| 5,032,979 A | * | 7/1991 | Hecht et al. |
| 5,557,742 A | | 9/1996 | Orchier et al. |
| 6,070,244 A | * | 5/2000 | Orchier et al. |

OTHER PUBLICATIONS

Smaha et al., 1994, Computer Security Journal, v. 10, p. 39–49.*
Garson, Apr. 1991, AI Exper, v6, n4, p. 46.*
Yngstrom et al., May 1997, Chapman and Hall, p. 1–13.*
Tsudik, 1990, Computer Security Journal, v. 6, no. 1.*
Phillips, Mar. 9, 1998, PC Week, v15, n10, p. 97, 110.*
Yau, Nov. 1994, Journal of Systems Management, v. 44, n11, p. 26.*
Teng, 1990, IEEE, p. 24–29.*
Kumar, Oct. 1995, Information Security Conference, vol. 1.*
Cloud, Jan. 1990, Journal of Systems Management, v. 41, n1, p. 13.*
Christoph, 1995, Computing Information and Communications Division, p. 1–26.*
D. Denning, "An Intrusion–Detection Model", IEEE Transxtions on Software, vol. SE–13, No. 2 (Feb. 1987), pp. 222–232.
S. Snap, et al., "DIDS (Distributed Intrusion Detection System)—Motivation, Architecture, and An Early Prototype", Proc. 14th Nat'l Computer Security Conf., Washington, D.C. (Oct. 1991), pp. 167–176.

* cited by examiner

*Primary Examiner*—Ayaz Sheikh
*Assistant Examiner*—Jenise Jackson
(74) *Attorney, Agent, or Firm*—Lowe Hauptman Gilman & Berner, LLP

(57) ABSTRACT

Disclosed is a Security Indications and Warning (SI&W) Engine usable in conjunction with an audit agent. The audit agent forwards normalized audits to the SI&W Engine. The SI&W Engine groups the normalized audits into related groupings. Gauges are used to count the number of occurrences of audited events. A statistical engine provides statistical representations of the number of events per user, per session and per node. A predetermined number of criteria are defined a particular gauge or gauge pair. There may be many criteria for a particular network. When a predetermined number of criteria within a criteria set are triggered, an indicator is triggered. More complex indicators can use combinations of lower level indicators to provide further indications of potential security threads. Thus, a hierarchical system of gauges, criteria and indicators is used to measure boundary violations and breaches of different barriers. Advantageously, because there are no predefined scenarios or profiles that must be performed by a potential misuser or intruder, the SI&W Engine of the present invention is capable of indicating that a potential security threat exists in near-real time.

27 Claims, 5 Drawing Sheets

METHOD AND SYSTEM FOR DETECTING INTRUSION INTO AND MISUSE OF A DATA PROCESSING SYSTEM

FIELD OF THE INVENTION

The present invention relates generally to intrusion detection systems for computer systems, and more particularly, relates to a method and system for detecting intrusion into and misuse of a computer on a computer network. Even more specifically, the present invention relates to a method and system for automatically recognizing that certain events have occurred making an intrusion or misuse likely. Advantageously, the present invention minimizes the need for expert system programmers to enter knowledge database rules, or selected misuses, or a signature process indicative of a misuse or intrusion, thereby permitting rapid processing of data from multiple systems to provide early indications and warnings of a suspected intrusion or misuse. In near-real-time, the present invention is capable of processing vast volumes of security relevant audit records from a heterogeneous network environment. Thus, the present invention enables an Information Security Officer (ISO) to take action in response to a real-time security threat.

BACKGROUND OF THE INVENTION

The development of the computer and its astonishingly rapid improvement have ushered in the Information Age with far-reaching effects in almost all aspects of commerce and society. Just like the physical infrastructures that support the American economy, there is a highly developed computer infrastructure, that supports the American and worldwide economies.

Besides traditional physical threats to security, the security of the United States is also dependent on protecting the computer infrastructure that supports American government and industry. The computer infrastructure is open to attack by hackers and others, who could potentially wreak havoc.

The President of the United States has recognized the ever increasing risk to these infrastructures and has created the President's Commission on Critical Infrastructure Protection. This Commission was constituted to determine which industries are (critical and whether these industries are vulnerable to cyber attack. The Commission issued a report and deemed transportation, oil and gas production and storage, water supply, emergency services, government services, banking and finance, electrical power and telecommunications to be critical industries which rely on the computer infrastructure.

A personal computer and a modem with access to the Internet are all the tools that a computer hacker needs to conduct a cyber attack on a computer system. The rapid growth of a computer-literate population ensures that millions of people possess the skills necessary to consider a cyber attack. The computer literate population includes recreational hackers who attempt to gain unauthorized electronic access to information and communication systems. These computer hackers are often motivated only by personal fascination with hacking as an interesting game. Criminals, and perhaps organized crime, might also attempt personal financial gain through manipulation of financial or credit accounts or stealing services. Industrial espionage can also be the reason for a cyber attack on a competitor's computer system. Terrorists may attempt to use the computer infrastructure. Other countries may use the computer infrastructure for national intelligence purpose. Finally, there is the prospect of information warfare, which is a broad, orchestrated attempt to disrupt a United States military operation or significant economic activity.

A typical secure computer network has an interface for receiving and transmitting data between the secure network and computers outside the secure network. A plurality of network devices are typically behind the firewall. The interface may be a modem or an Internet Protocol (IP) router. Data received by the modem is sent to a firewall which is a network security device that only allows data packets from a trusted computer to be routed to specific addresses within the secure computer network. Although the typical firewall is adequate to prevent outsiders from accessing a secure network, hackers and others can often breach a firewall. This can occur by cyber attack where the firewall becomes overwhelmed with requests and errors are made permitting access to an unauthorized user. As can be appreciated, new ways of overcoming the security devices are developed every day.

An entry by an unauthorized computer into the secured network, past the firewall, from outside the secure network is called an intrusion. This is one type of unauthorized operation on the secure computer network.

Another type of unauthorized operation is called a misuse. A misuse is an unauthorized access by a computer within the secure network. In a misuse situation, there is no breach of the firewall. Instead, a misuse occurs from inside the secure computer network. A misuse can be detected when an authorized user performs an unauthorized, or perhaps, infrequent operation which may raise the suspicion that the authorized user's computer is being misused. For example, an unauthorized user could obtain the password of an authorized user and logon to the secured network from the authorized computer user's computer and perform operations not typically performed by the authorized user. Another example might be where an authorized user is coerced into performing unauthorized or unusual operations.

There are systems available for determining that a breach of computer security has occurred. These systems can broadly be termed intrusion detection systems. Existing intrusion detection systems can detect both intrusions and misuses. Computer misuse detection is the process of detecting and reporting uses of processing systems and networks that would be deemed inappropriate or unauthorized if known to responsible parties. An intrusion is further qualified as an entry to a processing system or network by an unauthorized outsider.

Processing system misuse detection and reporting research has been funded by U.S. government agencies that have concerns for the confidentiality of their computer systems. Researchers have generally been associated with large research organizations or national laboratories. These institutions have required detailed knowledge of technical computer security, known threats and vulnerabilities, protection mechanisms, standard operational procedures, communications protocols, details of various systems' audit trails, and legal investigation of computer crimes. This misuse detection and reporting research has followed two basic approaches: anomaly detection systems and expert systems.

Anomaly detection systems look for statistically anomalous behavior. These systems assume that intrusions and other security problems are rare and that they appear unusual when compared to other user behavior. D. Denning, "An Intrusion Detection Model," Proc. 1987 IEEE Symp. Security & Privacy (February 1987) provides an anomaly detection model (hereinafter the "Denning Model") for detecting intrusions into computer systems. The Denning Model uses statistical profiles for user, dataset, and program usage to detect "exceptional" use of the system.

There are variations of the Denning Model and different applications of these various models. Anomaly detection techniques such as those based on the Denning Model, however, have generally proven to be ineffective and inefficient. Anomaly detection techniques, for instance, do not detect most actual misuses. The assumption that computer misuses would appear statistically anomalous has been proven false. When scripts of known attacks and misuses are replayed on computers with statistical anomaly detection systems, few if any of the scripts are identified as anomalous. This occurs because the small number of commands in these scripts are insufficient to violate profiling models.

In general, anomaly detection techniques cannot detect particular instances of misuses unless the specific behaviors associated with those misuses also satisfy statistical tests without security relevance. Anomaly detection techniques also produce false alarms. Most of the reported anomalies are purely statistical and do not reflect security problems. These false alarms often cause system managers to resist using anomaly detection methods because they increase the processing system workload without substantial benefits.

Another limitation with anomaly detection approaches is that users activities are often too varied for a single profile and can result in many false alarms. Statistical measures also are not sensitive to the order in which events occur, and this may prevent detection of serious security violations that exist when events occur in a particular order. Profiles that anomaly detection techniques use also may be vulnerable to conscious manipulation by users. Consequently a knowledgeable perpetrator may train the thresholds of detection system adaptive profiles to accept aberrant behaviors as normal. Furthermore, statistical techniques that anomaly detection systems use require complicated mathematical calculations and, therefore, are usually computationally expensive.

Expert systems (also known as rule-based systems or production system) have had some use in misuse detection, generally as a layer on top of anomaly detection systems for interpreting reports of anomalous behavior. Since the underlying model was anomaly detection, they have the same drawbacks of anomaly detection techniques.

Expert system approaches, in addition, are themselves inherently inefficient. S. Snapp, et al., "DIDS (Distributed Intrusion Detection System)" Proc. 14th Nat'l Computer Security Conf., Washington, D.C. (October 1991) describes one example of an expert system signature analysis model that detects misuse by looking for one specific event within a specific system context. In one study, this detection system was found to be two and four orders of magnitude slower than "hard-wired" techniques and much too slow for real-time operation. This also makes it impractical to use these systems to detect and report misuses of multiple associated processing systems through operation of a single misuse detection and reporting system.

Expert systems approaches are also not deterministic. Consequently, these rules are expressed in a declarative, non-procedural fashion. When rule changes occur, it is generally extremely difficult to predict how the new system will behave. This makes development and testing more complex and expensive. Moreover, expert system approaches are limited to the knowledge of the expert who programmed the rules into the system. However, an expert is only capable of programming the rules of behavior that the expert knows. Since there are often many different paths to a particular misuse, the expert will be unable to create rules that represent all of these paths.

More recent attempts at detecting misuse have relied on a signature mechanism with a signature being the set of events and transition functions that define the sequence of actions that form a misuse. This signature mechanism is described in detail in U.S. Pat. No. 5,557,742. The user selects a plurality of misuses that together form the signature mechanism. Although the signature mechanism goes a step beyond expert systems, it is similar to an expert system because it relies upon signatures or rules.

Study has revealed that system attackers use multiple "profiles" to gain access to system resources. Many intrusion detection systems rely on the fact that one of the profiles must be completed in order to signify an attack. This requires that the monitoring software of the intrusion detection systems be at least one step behind attackers because a profile must be accomplished before it can be encoded into an intrusion detection system. Unknown profiles may escape notice by the intrusion detection system because the system has no way of knowing about the new profile. Artificially lowering the detection on partial recognition can result in a large noise factor due to normal user behavior which matches a partial profile. Although, attackers may focus on known weaknesses and attempt to execute attack profiles, the prudent attacker may use a probing approach to find out information about the target system prior to attack.

Thus a need exists for an intrusion detection system which uses a value judgment basis as opposed to a matching type of basis. Further a need exists for an intrusion detection system which does not have to match "profiles" and thus does not need to have all approaches to attack on record. In addition a need exists for an intrusion detection system where the sequence of activities does not have to be predicted. A need exists for an intrusion detection system which can provide early warning of potential misuses and intrusions without relying on particular rules or signatures which can be easily subverted.

SUMMARY OF THE INVENTION

An object of the invention is to provide an early warning of a potential threat such as a misuse or intrusion.

Another object of this invention is to identify potential threats to the processing system in near real-time, using a system that monitors user actions that interact with barriers and boundaries within the monitored processing system and provides a timely warning that a threat exists.

An additional object of this invention is to provide an intrusion detection system in which particular misuses or intrusions do not have to be known in advance. The present invention does not require the use of signatures of particular misuses, nor does it require predefined scenarios or activity profiles that must be performed by a potential attacker in order to recognize a threat to the processing system.

An additional object of this invention is to provide an intrusion detection system in which particular misuses or intrusions do not have to be known in advance. The present invention does not require the use of signatures of particular misuses, nor does it require predefined scenarios or activity profiles that must be performed by a potential attacker in order to recognize a threat to the processing system.

The present invention, accordingly, provides a method and a system for detecting intrusion and misuse of data processing systems based on a value-judgment of user actions on the processing system. The present invention incorporates a "Security Indications and Warning Engine" (SI&W Engine) that is used to determine potential security threats by processing information contained in system audits, which are tokens of user activity on the system. User activity is a series of user actions within the monitored computer network environment, as represented by a stream of audit events (e.g., specific records that the Operating System (OS) software records to capture information about each happening). The events may be self-contained records with record attributes (date, time, user, machine) or may include links to other events. System audits also represent activities performed by the OS on behalf of users. System audits include (1) OS audit trail records; (2) OS log file data; aid (3) OS-maintained security state data.

In this context, a barrier is a system-level restriction on user actions. As used in the present invention, barriers are hardware and software checks and balances for system security. For example, the privileged system role of superuser (su) for administration in UNIX is a built in protection for improper use of powerful Operating System functions. Access to the su role is a barrier that a user could bypass to gain control of the UNIX operating system.

Similarly, a boundary is a policy-based limitation on user actions. A boundary defines limitations of acceptable behavior for a user or group of users within an organization. For example, the use of File Transfer Protocol (FTP) may be available on the computers on a network but the organizational policy may forbid the use of due to virus concerns. Instead of configuring the network to not provide FTP services, the organization may choose to monitor the use of FTP. Likewise, the use of the computers on the network outside of normal business hours may go against organizational policy.

These and other objects of the present invention are achieved by providing an SI&W security indication and warning (SI&W) Engine usable in conjunction with one or more Audit Agents (AAs). The SI&W Engine receives audit information from Audit Agents that collect system audits where they are produced and forward them to a consolidation point in the network, where the SI&W Engine resides. The AAs reduce the volume of audit information for consideration by the SI&W Engine by screening out numerous low-level audits representing Operating System activity performed on behalf of users. The AAs also consolidate and reformat system audits originating in a variety of data formats into a uniform record format for processing by the SI&W Engine. The activities performed by the AA are complementary data reduction activities that simplify the processing activities of the SI&W Engine, but are not considered part of this invention. The present invention provides a core methodology that processes an input audit stream to identify security events and related event descriptions representing user activities, and by so doing, evaluate the potential of an intrusion or a processing system misuse.

The SI&W methodology is used in the present invention requires identification of the barriers and boundaries that are to be monitored. In turn, these barriers and boundaries are translated into a set of key SI&W events to be monitored. In order to provide a measurement mechanism, the barriers and boundaries are represented within the SI&W engine by a set of gauges that measure activity against each of the key SI&W events. A gauge set is associated with every monitored user and machine in the monitored network environment.

The SI&W Engine uses a hierarchical aggregation of information collected in the gauges to ultimately evaluate the potential of a threat to the monitored system and to determine whether to produce a warning. Information in the gauges in aggregated into other measures called criteria and indicators to determine whether a potential threat exists. At the indicator level, information can be mapped into SI&W warnings understood by an ISO. Advantageously, because there are no predefined scenarios or profiles that must be performed by a potential attacker, the SI&W Engine of the present invention is capable of indicating in near-real time that a potential security threat exists.

The SI&W methodology, using indicators based on barriers and boundaries, has an inherent advantage over knowledge-based systems. It is only necessary to identify the indicators—not the various sequences in which they might occur. Since the SI&W methodology uses indicators based on barriers and boundaries, there are a finite number of barriers and boundaries to be identified and catalogued. Knowledge-based systems must try to be comprehensive in their descriptions of known attack scenarios. In most cases, however, an attacker can use any number of combinations of steps to accomplish his objective. Knowledge-based systems must identify each pattern to be effective.

The SI&W Engine includes statistical measures and a configurable rule-base for evaluation of criteria and indicators, thus allowing the Information Security Officer (ISO) to interactively change, delete, and create new rules and criteria. The SI&W Engine triggers warnings when indications are evaluated to represent a potential threat. The SI&W warnings are assigned an overall significance value, allowing the human operator to make a value judgment of the importance of each warning.

The SI&W Engine also uses an internal value-judgment mechanism to evaluate the significance of incoming events. The system does not assume that all barriers and boundaries are of equal significance in the identification of potential threats. The SI&W engine can associate encoded, weighted values with individual barriers and boundaries on a per user/source basis. These values can be table-based or encoded into the rules for evaluation of gauges. Weighting allows significant security events to be "rated" higher for some users/machines than for others. Table-based values could be adjusted dynamically with appropriate feedback to dynamically adjust the noise level. The weighted values and user adjustments could be monitored to identify configurations which may cause inadvertent suppression of warnings.

The value-judgment approach offers a more realistic perspective on network activities than previous intrusion detection systems where users, roles, sources, and events all had the same level of priority. In reality, administrators generate many more noise level messages than standard users and insignificant machines have just as much priority as critical machines.

The value-judgment approach also allows the SI&W methodology to effectively address two key problems faced by all intrusion detection systems. The SI&W mechanism can translate breaches of barriers and crossing of boundaries into warnings that would ordinarily be indistinguishable from the routine, noise-level events. For example, the occurrence of a successful su to superuser would ordinarily be lost in the stream of noise-level events, but when associated with other combinations of events or a certain class of user, it might be elevated to the level of a warning. The SI&W mechanism is also effective in suppression of false positive warnings, e.g. warnings that that are not valid. For example, failure of certain operations by a superuser might be assigned a lower value than if that same failure occurred with an ordinary user. Excess false positive warnings can reduce the effectiveness of an intrusion detection system because the excessive warnings tend to be ignored.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

The present invention is usable in conjunction with an audit reduction system described in the related U.S. Pat. No. 6,134,664, issued Oct. 17, 2000, entitled "Method and System for Normalizing Audit Trail Records Received from Heterogeneous Sources" assigned to the instant assignee, and incorporated by reference into this specification in its entirety. The present invention is also usable in conjunction with a system described in U.S. Pat. No. 6,408,391, issued Jun. 18, 2002, entitled "Dynamic System Defense for Information Warfare" assigned to the instant assignee, and incorporated by reference into this specification in its entirety.

A method and apparatus for intrusion according to the present invention are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The present invention provides a method and system for detecting intrusion and misuse of data processing systems. The data processing system may be a single host computer system or a distributed, network environment.

Figure 1:
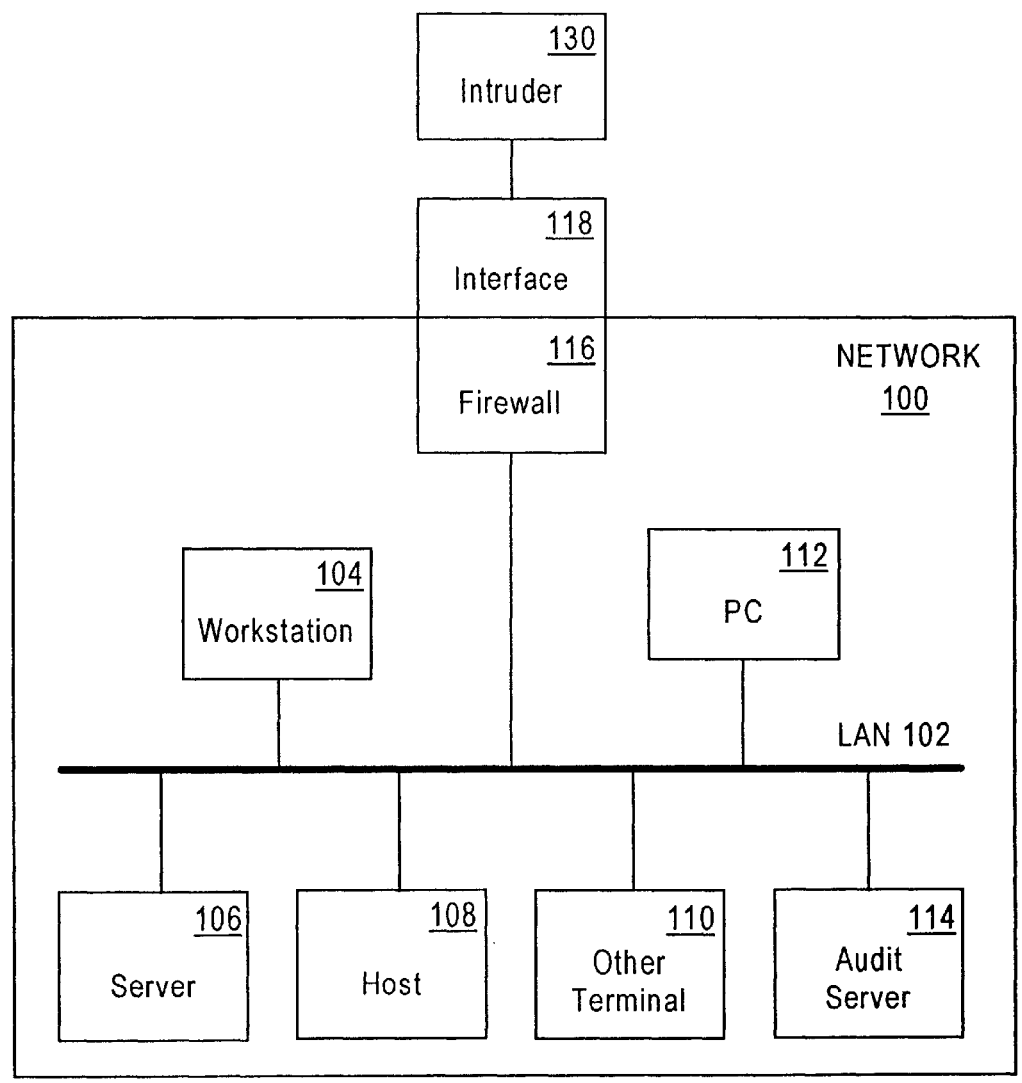
FIG. 1 is a high-level block diagram of an exemplary secured computer network on which the present invention can be used.

FIG. 1 is a block diagram illustrating an exemplary computer network 100 including a plurality of network devices on which an embodiment of the invention can be used. The network devices include devices such as hosts, servers, workstations, and personal computers (PCs). The present invention is usable or such networks as ARCnet, Ethernets and Token-Ring networks, wireless networks, among other networks. The network 100, in this example, has a central network cable 102, also known as media, which may be of any known physical configuration including unshielded twisted pair (UTP) wire, coaxial cable, shielded twisted pair wire, fiber optic cable, and the like. Alternatively, the network devices could communicate across wireless links.

The network 100 includes a workstation 104, a network server 106, a host computer 108, a terminal 110, and a personal computer 112 all coupled to the network cable 102. Each network device 104, 106, 108, 110, 112 can also be considered a node because each device has an addressable interface on the network. As can be appreciated, many other devices can be coupled to the network including additional personal computers, mini-mainframes, mainframes and other devices not illustrated or described which are well known in the art.

An Audit Server 114 used for the SI&W Engine according to the present invention is coupled to the network cable 102. A firewall 116 connects the secure network 100 to an interface 118. The firewall 116 is a combination hardware and software buffer that is between the internal network 100 and external devices outside the internal computer network 100. The network devices within the internal network 100 appear within the box in FIG. 1, and the external devices outside the internal network appear outside the dashed lines in FIG. 1. The firewall 116 allows only specific kinds of messages from external devices to flow in and out of the internal network 100. As is known, firewalls are used to protect the internal network 100 from intruders or hackers who might try to break into the internal network 100. The firewall 116 is coupled to an interface 118. The interface 118 is external to the network 100 and can be a modem or an Internet Protocol (IP) router and serves to connect the secure network 100 to devices outside the secure network. For illustrative purposes, an intruder computer system is depicted at 120.

Figure 2:
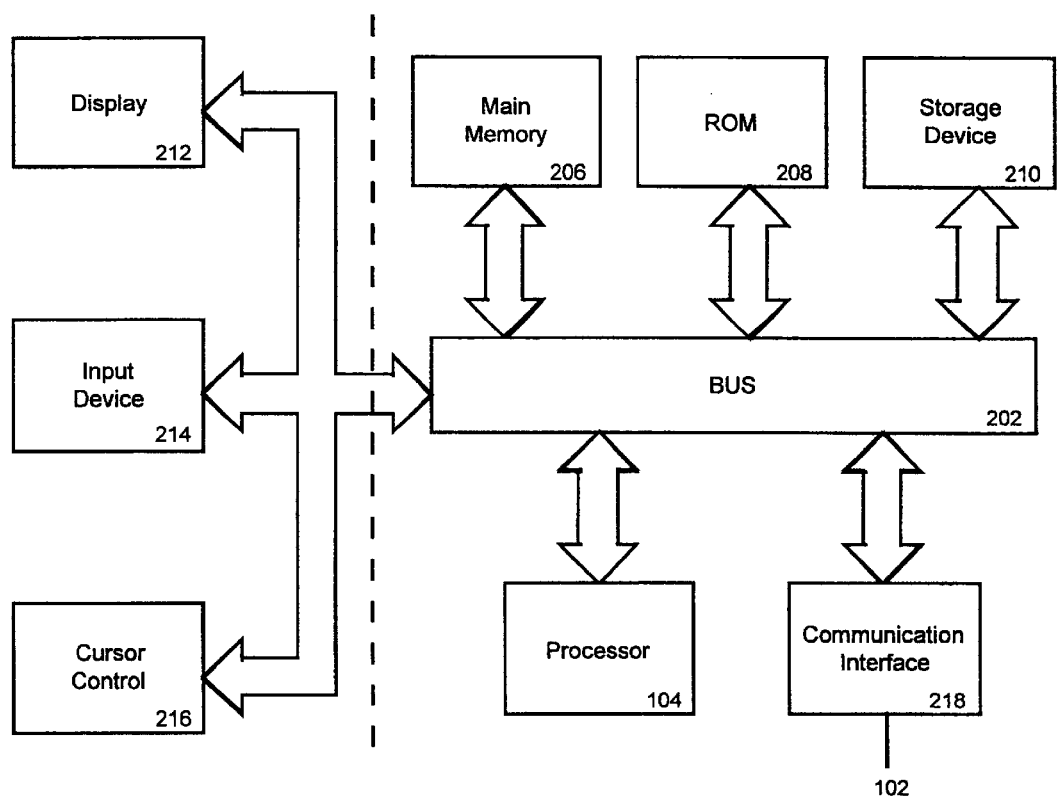
FIG. 2 is a high-level block diagram of an exemplary computer system on which the present invention can be implemented.

FIG. 2 is a block diagram illustrating an exemplary computer system, such as the server 114 depicted in FIG. 1, usable on the internal secure network 100. The server 114 preferably has a UNIX windowed platform such as a Sun SPARC station. The present invention is usable with currently available personal computers, mini-mainframes, mainframes and the like. Although computer 112 is depicted in FIG. 1 as a network device which is part of a wired local network, the computer 112 is also envisioned as being connected to the network 100 by a wireless link.

Server 114 includes a bus 202 or other communication mechanism for communicating information, and a processor 204 coupled with the bus 202 for processing information. Server 114 also includes a main memory 206, such as a random access memory (RAM) or other dynamic storage device, coupled to the bus 202 for storing information and instructions to be executed by processor 204. Main memory 206 also may be used for storing temporary variables or other intermediate information during execution of instructions to be executed by processor 204. Server 114 further includes a read only memory (ROM) 208 or other static storage device coupled to the bus 202 for storing static information and instructions for the processor 204. A storage device 210, such as a magnetic disk or optical disk, is provided and coupled to the bus 202 for storing information and instructions.

Server 114 may be coupled via the bus 202 to a display 212, such as a cathode ray tube (CRT) or a flat panel display, for displaying information to a computer user. An input device 214, including alphanumeric and other keys, is coupled to the bus 202 for communicating information and command selections to the processor 204. Another type of user input device is cursor control 216, such as a mouse, a trackball, or cursor direction keys for communicating direction information and command selections to processor 204 and for controlling cursor movement on the display 212. This input device typically has two degrees of freedom in two axes, a first axis (e.g., x) and a second axis (e.g., y) allowing the device to specify positions in a plane.

The processor 204 can execute sequences of instructions contained in the main memory 206. Such instructions may be read into main memory 206 from another computer-readable medium, such as storage device 210. However, the computer-readable medium is not limited to devices such as storage device 210. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 206 causes the processor 204 to perform the process steps described below. In alternative embodiments, hard-wired circuitry may be used in place of or in combination with software instructions to implement the invention. Thus, embodiments of the invention are not limited to any specific combination of hardware circuitry and software.

Server 114 also includes a communication interface 218 coupled to the bus 202. Communication interface 218 provides two-way data communication as is known. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. In the preferred embodiment the communication interface 218 is coupled to the network cable 102. Wireless links may also be implemented. In any such implementation, communication interface 218 sends and receives electrical, electromagnetic or optical signals which carry digital data streams representing various types of information. Of particular note, the communications through interface 218 may permit transmission or receipt of intrusion detection information. Before discussing the specific implementation of the present invention, some additional background will be provided. A primary goal of the invention is to perform Security Indications and Warning (SI&W) analysis of current or pending security relevant activities in order to provide timely warnings of potential security threats. On the premise that audit information represents tokens of user behavior, it is possible to monitor user and process behavior (and thereby detect anomalies in that behavior) by accomplishing timely analysis of security-relevant audit information. Anomalies in that behavior may be indicative of potential security threats.

In today's computing environments, in which computers are distributed on a network, it is important to perform security monitoring of all relevant network nodes to attain a comprehensive, system-wide security posture. Timely analysis of that information allows recognition of suspicious behavior as it occurs and permits the ISO to respond to the behavior quickly enough to effectively counter a possible security threat.

The present invention addresses the following specific needs:
1) perform timely audit analysis in a network environment,
2) automate detection of suspicious behavior,
3) work with minimal user involvement,
4) help define a model for security monitoring, and
5) allow an organization to respond to an evolving variety of threats.

Monitored systems can produce a huge amount of audit data which must be analyzed and interpreted. Because of these large volumes of audit data, the effective analysis of user, host, and process behavior requires both an efficient method for data collection and a strategy for data analysis. In a heterogeneous network environment, these systems can also produce system audits in a wide variety of record formats. The overall approach used by the present invention is to place special audit collection functions on (or logically near) the monitored network nodes to perform audit preprocessing and place the security monitoring, audit analysis, and warning production functions at a central point on the network.

The audit preprocessing functions are accomplished by an Audit Agent (described in the related patent application entitled "Method and System for Normalizing Audit Trail Records Received From Heterogeneous Sources"). The security monitoring, audit analysis, and warning production functions are accomplished by the SI&W Engine described in this patent application.

The Audit Agents support the SI&W process by collecting system audits where the system audits are produced, i.e., on the various network nodes 104–116, reformatting the data, reducing the volume of the data, and then forwarding the reformatted data as streams of audit records to a central consolidation point in the network, e.g., the Audit Server 114, where the reformatted data are processed by the SI&W Engine. The AAs reduce the volume of audit information for consideration by the SI&W Engine by screening out numerous low-level audits representing Operating System activity performed on behalf of users. The AAs also consolidate redundant information and reformat system audits produced in a variety of data formats into a single, uniform record format for processing by the SI&W Engine. The reformatted audits are called normalized audits. The activities performed by the AA are complementary data reduction activities that simplify the processing activities of the SI&W Engine, but are not considered part of this invention.

The SI&W Engine consolidates and analyzes security relevant audit data produced by a heterogeneous set of monitored hosts and workstations, each representing a different source of audit information. The SI&W Engine also includes statistical and expert systems components to support the analysis functions. The SI&W Engine can detect specified events and threshold exceptions, and then perform statistical checks and expert system threat evaluation. When anomalous situations are detected, the situations are brought to the attention of the ISO who can obtain further information, initiate more involved analysis, and optionally intervene or terminate the situation.

The number of audit records processed, or examined, by the SI&W Engine varies with the level of current activity (activity load and nature); with the current collection granularity (level of audit collection); and potentially with the current security concern level (interpretation of security status).

The essential problem in the analysis of audit records is the timely correlation and fusion of disjoint details (i.e., audited events) into an assessment of the current security status of users and hosts on a network. In some cases the analysis of one audit record alone may itself be sufficient for warning. However, it is certain that most situational analyses would need to be much more intensive and complex. The analysis will require the correlation of diverse audited events, possibly by a number of users and on separate machines, buried in the audit trail.

The most recent prior art systems use a scenario-based methodology (see U.S. Pat. No. 5,557,742) which matches activities against a template. The present invention uses an SI&W methodology based on the monitoring of user actions that interact with known barriers and boundaries. This methodology includes the weighted analysis of information as it relates to other activities on the network, but importantly, the activities are not to be matched against a template or scenario.

Barriers and boundaries represent "tripwires" in the monitored environment for recognition of security-relevant user activities. Barriers represent system-level restrictions imposed on user actions whereas boundaries represent policy-based limitations imposed on user actions. Barriers are typically represented by privileged system functions built into the hardware platform or the Operating System. An example might be the use of the privileged system role of superuser (su). The Operating System will typically produce an audit whenever there is an attempt to use this feature. Boundaries, on the other hand are represented by normal user activities that exceed a soft limitation imposed by policy. For example, the File Transfer Protocol (FTP) may be available for use on a system, but may be restricted because of concerns over virus propagation. The Operating System can produce audits whenever this function is used.

Barriers and boundaries may differ in each monitored environment, primarily because the security policy can vary in each, but also because the physical environment may be different. The present invention identifies a core set of barriers and boundaries defined as a default set, but allows for the core set to be extended as necessary to accommodate specific environments. Each environment, thus, may have a unique set of barriers and boundaries defined for that environment. Not every environment will necessarily be configured to make use of the entire range of barriers and boundaries defined in its set. More specifically, some environments may not produce the requisite level of audits to actively monitor all of the user and machine actions that interact with the barriers and boundaries. In that case, those barriers and boundaries not monitored are said to be inactive in that environment.

For implementation within the SI&W Engine, the set of barriers and boundaries defined for that environment is mapped into a set of specific user actions or system actions that can be measured with audits. These actions are called key SI&W events and are measured with a mechanism called gauges. A set of gauges is associated with each monitored user and each monitored machine in that environment.

Figure 3:
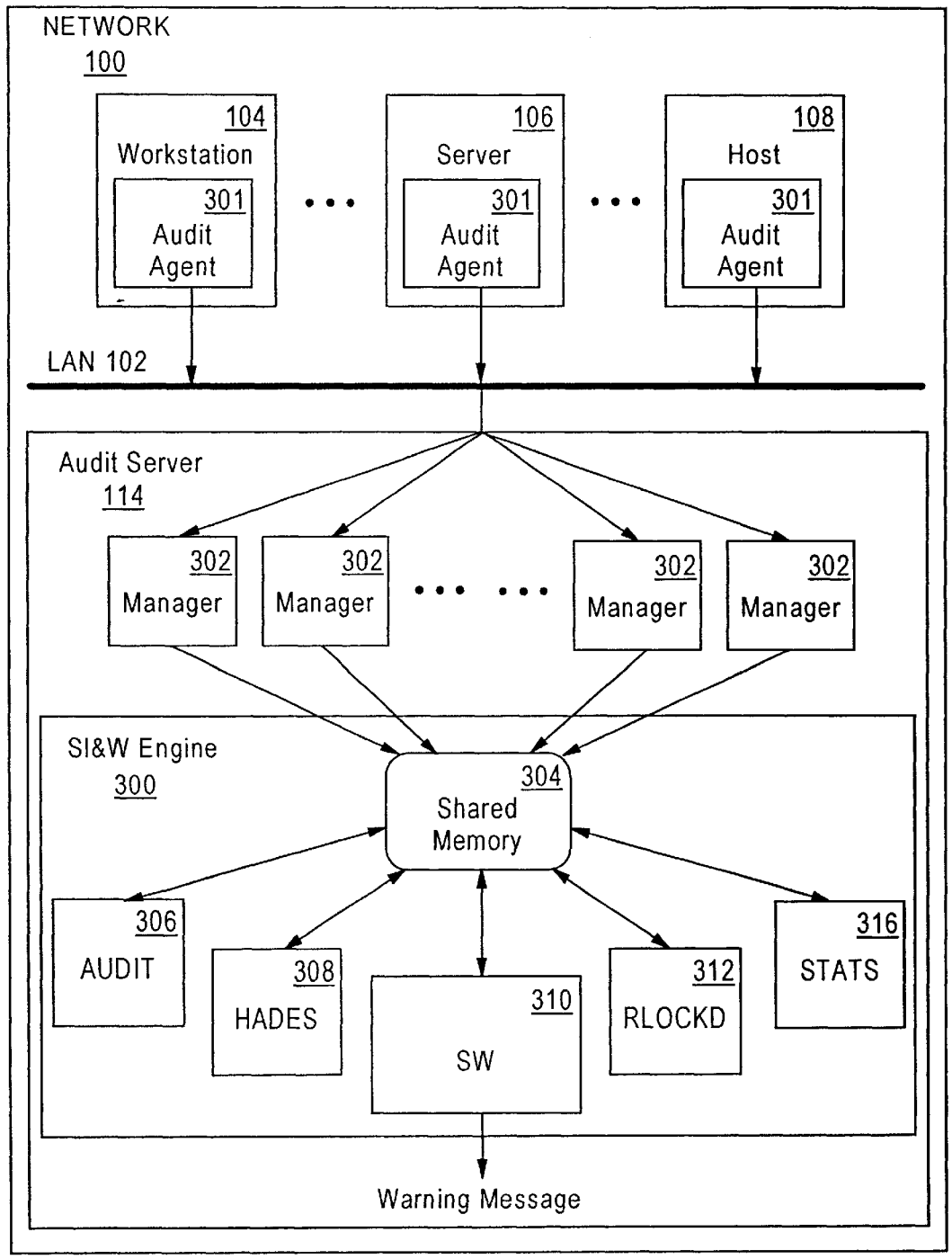
FIG. 3 is a block diagram of a logical architecture of the security indications and warning system according to the present invention.

Referring now to FIG. 3 and bearing in mind the overview discussion, the present invention is explained in detail. The SI&W Engine 300 operates on an Audit Server 114 receiving normalized audit data from Audit Agents 301 in a network environment 102. Audit records are received and handled by the MANAGER process 302 on the Audit Server. The MANAGER process is a forking server daemon that clones a copy of itself for each Audit Agent and completes a requested socket connection with each monitored node 104–108. A daemon is a background process capable of initializing other processes with little or no input from the user. Daemons typically provide services (such as printing or server advertising) in the UNIX environment. After accepting audit records from the monitored nodes 104–108, the MANAGER process the audit records and directly forwards the normalized data to the AUDIT process 306 via an input queue held in Shared memory 304.

The SI&W Engine 300 includes Shared memory 304 and individual SI&W modules that cooperate in the consolidation and analysis of audit information and the production of warnings. The SI&W modules interact via Operating System signals and data elements in Shared memory 304. The Shared memory 304 facility contains common data structures that hold all information used by the SI&W Engine 300. The shared data structures include input queues, gauges, criteria, rules, indicators, and control information.

A portion of the SI&W Engine 300 analysis of activity is done periodically rather than in real time, in order to provide different levels of analysis. For example, boolean rule-based analysis occurs on a short cyclical basis, but session-level analysis occurs at the end of a session and trend analysis using statistics can be accomplished over a longer period of time. Boolean rule-based analysis tasks are performed frequently enough that the SI&W Engine 300 can detect a security threat in near real-time.

The logical architecture of the SI&W Engine 300 provides a framework in which several independent processes, e.g., AUDIT 306, STATS 316, and HADES 308, can perform near real-time analysis of current activity on monitored systems, posting results in a common data structure for access by other processes. As the SI&W Engine 300 processes the incoming audit stream, the SI&W Engine 300 maps events in that audit stream into the key SI&W events and updates the associated gauges. Each gauge is updated by only one designated process, but any gauge can be read by another process that uses the value of the gauge in its own computations. Gauges are reset by a control process, when appropriate. The AUDIT process 306, for example, can update a gauge used as a counter for file accesses, and the STATS process 316 can subsequently read the file access counter gauge, derive statistical measures from it, and put the computational results in other statistical gauges.

The SIW process 310 is the central process that manages the overall SI&W system processing. The SIW process 310 is responsible for initializing all shared data structures and interprocess communication mechanisms used by the various processes within the SI&W Engine 300. It is also the process that communicates with external processes on the Audit Server to cause a warning message to be displayed for the ISO when a warning is produced by the analysis functions.

The RLOCKD process 312 is the SI&W locking process that arbitrates access to shared user and host information within Shared memory 304 for subsequent monitoring and detection.

The AUDIT process 306 receives normalized audit records on a Shared memory 304 input queue and manages the conversion of that data into an internally managed format. The AUDIT process 306 parses that audit information and places it into internal data structures that can be used by other processes and updates gauges that measure the event. In addition, the AUDIT process 306 performs additional checks to determine whether optional processing code is associated with the audit event. This processing code represents special processing such as "dialing a pager" that can be associated with specific events. For a defined subset of audit events, AUDIT 306 also initiates real-time processing activities.

The STATS process 316 performs statistical processing and updates gauges with statistical computations. Whenever a gauge value is changed by the AUDIT process 306, the audit process 306 sends a signal to the STATS process 316 to analyze the gauge information and update statistical values maintained in the gauges. The STATS process 316 also updates criteria when the values in gauges exceed a specified threshold.

The Hierarchical Anomaly Detection Expert System (HADES) process 308 evaluates the current state of criteria and indicators whenever an update to the criteria has been made by the STATS process 306. The HADES process 308 performs evaluation of rules and determines the level of concern for each monitored entity based on current and past activities (as reflected in the criteria sets and analysis records). The HADES process 308 ultimately produces a warning message when the evaluation of monitored entities indicates that a warning should be produced. The HADES process 308 then signals the SIW process 310 to handle the notification of external processes that display the message for the ISO.

Figure 4:
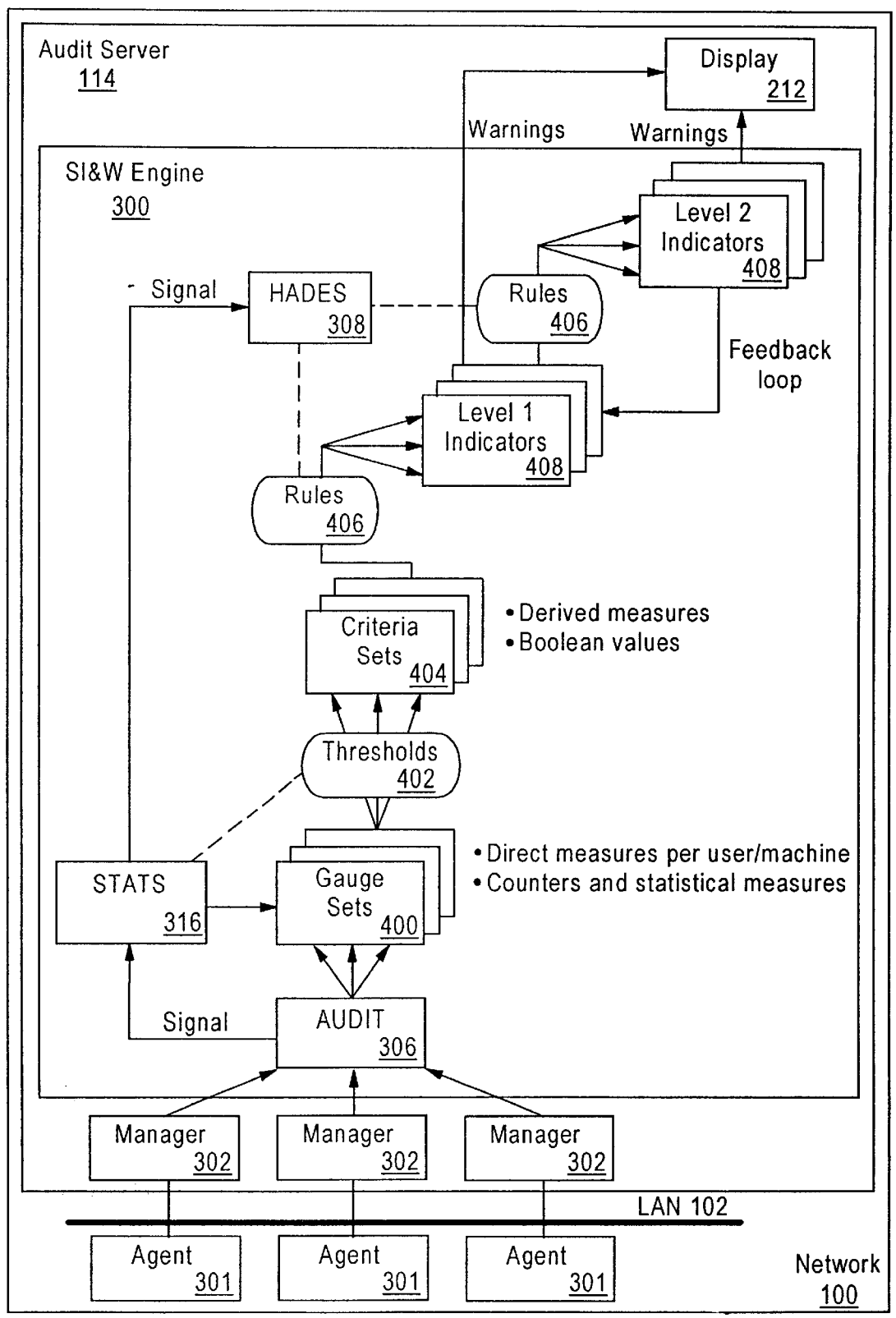
FIG. 4 is a block diagram of a logical architecture of an anomaly detection method used by security indications and warning system according to the present invention.

Referring now to FIG. 4, a logical architecture of the SI&W methodology is depicted according to the present invention. Three Audit Agents 301 forward streams of normalized audit records to the Manager processes 302 on the Audit Server 114, where the streams are directed to the SI&W Engine 300 for detailed analysis. Any number of audit agents 301 can be used. Warnings produced by the SI&W Engine 300 are directed to the display 212.

The SI&W Engine 300 uses the information in the normalized audit streams to monitor user activities that interact with barriers and boundaries in the monitored environment. These interactions can be identified by recognizing the occurrence of specific user actions. These user actions are represented internally as a set of key SI&W events to be monitored. The SI&W Engine 300 measures key SI&W events with a mechanism called gauges. Gauges can be simple counter gauges measuring occurrences of an event or they can be statistical gauges containing rate measures. Gauges of each type are associated with each key SI&W event. The gauges associated with the entire set of key SI&W events are called a Gauge Set 400.

The SI&W Engine 300 maintains a separate Gauge Set 400 for each monitored user and machine. This enables it to maintain a per user view and a per node view of the current security status of Network 100 and evaluate concern levels for individual users and network nodes. The SI&W Engine 300 uses a hierarchical aggregation of information collected in the gauges to ultimately evaluate the potential of a threat to the monitored system and to determine whether to produce a warning. As gauges are updated, the gauges are evaluated to determine whether significant thresholds of user activity have been reached. If so, the SI&W Engine 300 performs further analysis.

As normalized records are received by the SI&W Engine 300, the AUDIT process 306 maps the user actions represented by these records into one or more applicable SI&W events. The AUDIT process 306 then increments counter gauges linked to that event in the associated Gauge Sets 400 (i.e., the set associated with that user and the set associated with that machine) to provide a direct measurement of activities being monitored. For each Gauge Set updated, the AUDIT process 306 signals the STATS process 316 to update the remaining gauges linked to that event. The STATS process 316 also updates all Gauge Sets 400 on a periodic basis, regardless of whether user activity stimulates an update.

At the next level in the hierarchy, a Criteria Set 404 is associated with each user and machine. Criteria are boolean values providing an abstract representation of user activity. When a criterion is turned on, it indicates that a certain kind of activity has occurred and that the activity level has reached a designated level of concern. Each criterion is linked to a single counter gauge or else a pair of counter gauges or statistical gauges defining a ratio. The gauge pair need not be associated with the same SI&W event. Each criterion has a Threshold value 402 for that measure that determines when the criterion gets triggered. The STATS process 316 updates a Criteria Set 404 whenever a change is made to a related Gauge Set 400. The STATS process 316 evaluates the threshold values to determine which criteria are triggered. Gauges bear a one-to-one or a one-to-many relationship to criteria, so sometimes an update of a single gauge can cause several different criteria to be triggered.

At the next higher level in the hierarchy, information in the criteria is aggregated into Indicators 408 associated with each user and machine. Indicators themselves may also be aggregated to provide different abstract views of user activities, if desired. Indicators, like criteria, are boolean values indicating whether a certain condition exists. The HADES process 308 is responsible for updating indicators. The HADES process 308 receives a signal from the STATS process 316 whenever a change is made to a Criteria Set 404. The HADES process 308 then examines each indicator and its associated Rule 406 to evaluate whether the indicator should be triggered. At the lowest indicator level, each rule defines an association with one or more criteria and conditions under which the indicator should be triggered. At a higher level, a rule defines an association with one or more indicators and the conditions under which the indicator should be triggered. The HADES process 308 evaluates indicators to ultimately determine whether a potential threat exists and whether to produce a warning.

The framework of criteria and indicators is configurable to allow the ISO to define indicators (i.e., abstract events); categorize sets of such indicators; organize them in a hierarchy; and define acceptable sensitivity ranges, or thresholds, for a set of gauges that stimulate them. These sensitivity ranges are specified at the granularity level of single users and nodes. The overall relationship of indicators forms a hierarchy of security status levels. A series of generic indicators are specified and related via recognized "threat" sets (masquerader, imposter, browser, etc.). Threat sets represent subjective classes of behavior known to indicate a threat to the system being monitored. Specific system attacks and misuses can usually be treated as a subset of a generally defined class of threat. This is essentially the same problem as that of defining "suspicious" behavior. Since the sets of recognized threats is extensible, and since a generic miscellaneous threat set is included, the present invention advantageously creates an easily extensible definition of "suspicious" behavior.

As audit records are processed by the SI&W Engine 300, the audit records are collected and associated such that monitoring and analysis activities can be applied at different levels of abstraction. Audit events can be grouped into a related set of events (threads of activity), periods of activity (sessions), or trends of activity (multiple sessions) at the indicator level. For example, all audit records associated with a certain user may be grouped into a thread. Another thread could be all audit records for a certain computer system or all audit records for a network. Another thread could be all the audit records for two different users grouped together. As can be appreciated, the number of threads is potentially infinite.

The SI&W methodology allows for predefined weights to be associated with individual gauges on a per user/source basis under the basic premise that all barriers and boundaries are not of equal significance in the identification of potential threats. The weights can be used in the SI&W analysis to increase or decrease the importance of specific actions. Thus, significant actions may be "rated" higher for some users/machines than for others.

Previous intrusion detection systems associated users and different sources with equal weighting. The previous intrusion detection systems gave an unrealistic "flat" perspective to activities. In reality, administrators generate much more noise level messages than standard users and certain machines might have higher importance because of the type of data they contain.

Weights can be static or dynamic. Static weights can be implemented as part of the rules, whereas dynamic weights can be implemented as a table associated with each gauge set. Dynamic weights can be adjusted by changing values in the table. With dynamic weights, an organization using the invention can dynamically adjust the security noise level by adjusting the weights. The boundaries and barriers system of the present invention, when using dynamic weights, works on the principle that activities associated with a given user and host start out with assigned weights at a collection point. Typically all of the users start out at the same level. Any of the assigned values can be offset up or down independently and dynamically as the system runs (the assigned value is maintained as a reference).

For example, if user A working on system B generates an OS event of failed su, the SI&W Engine can adjust subsequent other events and activities on the user session accordingly. The weighted value of the user can be offset with a significance offset and subsequently, can be compared to other users on the system based on the significance of the initial failed su. Next, if user A logs into system C and receives a boundary violation on number of prints, the system may generate an internal non-alert warning based on user A's activities. The activities might trip an indicator (elevated user concern) valid for a designated period of monitoring.

Independently, the activities should not raise warnings because, of themselves, they do not indicate significant actions. However, over time, other session activities may occur which indicate a probing of the system for weaknesses. The indicator (elevated user concern) could trigger another indicator and subsequent rules beyond multiple user A sessions. In current profile based or rule based intrusion detection designs, this would be a very hard profile to code because it is not known what user A's next action would be. It would be difficult for the system to implement many-to-many relationships as rules because of the complexity. However, because of the weighted values, different combinations can be assigned the same significance. Eventually, the user's activities are going to cross the threshold for normal barrier and boundary violations by a user for a given time and the system will notify the ISO.

The SI&W Engine 300 can also be used to monitor the weight values and user adjustments to identify configurations which may cause inadvertent suppression of warnings. The change of thresholds can be evaluated mathematically to determine the number of scenarios (based on weights) that will be suppressed.

The value-judgment mechanism with other "fuzzy logic" aspects of the SI&W Engine 300 allows for a powerful capability to identify activities within noise and to set a threshold of normal expected activity. The additive effect of the weighted values can indicate that seemingly unconnected events may in fact be an indication of a previously unknown attack. Consequently, the SI&W serves as a framework for countering an evolving set of threats in changing environments.

Specification of SI&W Events

Specification of key SI&W events to be monitored begins with examination of the security policy in the monitored environment and the built-in system-level security features to identify barriers and boundaries to be monitored. These are then mapped into user actions that equate to key SI&W events. The total number of key SI&W events to be monitored might well be constrained by the processing resources available to the SI&W Engine 300 and the need to for the SI&W Engine 300 to process data quickly. In a non-resource-limited environment, it would be possible to map user actions affecting each identified barrier or boundary to one or more key SI&W events. In practice, the number of key SI&W events to be monitored is pared down to a manageable number. Any or all of the gauge definitions can be changed in order to tailor the SI&W Engine 300 to the monitored environment. For example, some sites might have an automatic log-off mechanism called "deadman", which needs to be monitored. Other sites may not have such a mechanism.

An example of how user actions might be mapped into key SI&W events might be actions involving the password file, where a key event might be specified for deleting the file and a second key event identified for copying the file. Since the password file is a significant barrier, this level of mapping is appropriate. In practice, resources are limited and this is not always possible. Oftentimes, similar user actions are mapped into a single SI&W event. An example is critical system files, like the hosts file, the group file, etc. These might mapped into a single SI&W event. The gauge threshold for criteria linked to the gauges measuring that event must be carefully adjusted (tuned) to account for multiple barriers and boundaries measured by a single gauge. In general, the sensitivity must be lowered to minimize false positives originating from those gauges.

Gauges

Gauges are the mechanism used by the SI&W Engine 300 to measure key SI&W events. Gauges allow all SI&W events to be handled by the SI&W Engine 300 in a standardized manner. They also provide a convenient mechanism for representing ongoing user actions in a very dense format. Individual gauges may be either counters or statistical measures. Each key SI&W event is assigned two counter gauges and eight statistical gauges. The set of gauges associated with all of the key SI&W events is called a gauge set.

A gauge control table, initialized at startup time from a configuration file, defines what gauges are available in a given configuration. Each monitored user and user node is allocated a set of gauges corresponding to the table. A single user action identified as a key SI&W event is recorded in at least one gauge associated with that user and at least one gauge associated with the network node on which the action occurred. The gauge tables provide an identifying label for each gauge, and are used in associating the gauges with individual criteria There is a one-to-many relationship between gauges and criteria, such that a single gauge can have multiple interpretations via linkage to different criteria.

Counter gauges are used to count the number of occurrences of SI&W events on a per user and per machine basis within a specified time frame. One counter gauge is used to measure user actions over the lifetime of a session; the other counter gauge is used to measure user activities over the span of one hour. The second gauge is for use in a transaction-oriented environment. In the case of a machine, a session is considered to be the period of time since it was turned on. If a machine never gets turned off, the session counter can be periodically reinitialized. Counter gauges are initialized to zero at the beginning of each user session.

Statistical gauges are used to hold rate measures for each SI&W event. The rate measures are derived from the information in the counter gauges, using statistical algorithms. Each occurrence of a particular SI&W event in the audit stream will cause a change in the value of all eight statistical gauges measuring that event.

Unlike counter gauges, statistical gauges bear no relationship to a user session. They are continuous measures that represent the rate of occurrence of SI&W events in an audit stream, as measured over different periods of time. The only difference between the eight gauges is the period of time for which they are relevant. The statistical computations employ a logarithmic algorithm that permits the values to decay over time. The rate of decay is commonly called the half-life, e.g., the time it takes the value to decay to half of its original value. With cessation of activity, the value will eventually decay to an effective value of zero. The statistical gauges cover a range of half-life from very short, e.g., 30 seconds, to very long, e.g. 64 hours. A gauge with a short half-life will be more sensitive to recent events than a gauge with a long half life. Gauges with a long half-life enable the SI&W Engine to monitor activities that might span several user sessions. In either case, recent events are given more relevance than older events.

The significance of rate measures lies not in the value of the rate itself, but in the comparison between rate measures. A common measure used by the SI&W Engine 300 is the ratio between two gauges. Typically, the ratio is derived from a pair of gauges assigned to the same event, but covering different periods of time. Comparison of the rate measures is meaningful because each of the rate measures is normalized to a common denominator rate of occurrence over a period of one hour.

Values of statistical measures for each monitored user network node are periodically written to disk files (at least at the end of each session). Statistical values are recalculated at a frequency low enough to avoid excessive processing overhead, yet high enough that significant anomalies will be detected soon after they occur. This frequency can be tuned to the needs of a specific environment. At the beginning of a session, the appropriate values are loaded from the disk file to initialize the data structures used in the statistical computations. The STATS process 316 maintains a private set of accumulator structures for each monitored subject. Computations are based on values from gauges as well as intermediate values from related formula calculations. All results which are to be used by other processes are output to gauges after they are computed.

Time is a critical input to the statistical formulas. Time values used are obtained (indirectly) from the audit stream, using delta time values contained in the normalized audit records. Delta time values are computed by the Audit Agents based on the difference between the local system clock and a reference system clock i.e., the system clock on the Audit Server. Delta time permits chronological sequencing of events from different network nodes. All statistical values for a particular monitored subject, e.g., a user, host, or process, are updated at the same time. First the virtual time is recorded and all of the input values are obtained; then the computations are performed and the results posted to indicators or other gauges, according to the associated rules. This avoids the necessity of storing the previous update times separately for each accumulator.

Rate measures are then calculated by an exponential formula which gives more weight to recent events than those in the more distant past. Each rate measure is based on a logarithmic half-life; the reciprocal of the half-life is the data decay rate. The logarithmic half-life is the length of time in which the rate measure will decay to half its current value if the associated count value does not increase in that time. With a logarithmic decay, a value is at its highest immediately after it is established. It then tapers off rapidly at first and then more slowly as time goes on. If the count value increases at a constant rate, all rate measures, regardless of half-life, will stabilize at a value indicating the rate of increase in the count. Rate measures with short half-lives will respond quickly to short-term changes in the rate of occurrence of the associated event; and those with long half-lives will give an indication of the average rate over a longer period of time.

The SI&W Engine 300 is configured to use a standard set of half-life values for each set of rate measures (associated with the same audit event or performance measure). This enables direct comparison between rates for different event types and for different users/nodes. The rate measures are expressed in units that are meaningful to a human analyst normally number per hour.

Use of two rate measures with very short half-lives, such as one minute and two minutes, enables a powerful fuzzy-logic style correlation between different events and performance measures. The ratio between the one-minute rate measure and the two-minute rate measure will be greater than one for those event categories whose rate has increased during the last minute. The set of event categories with positive ratios can be checked against previously observed or stipulated patterns.

Criteria

The SI&W Engine 300 aggregates information collected in gauges to increasingly higher levels of abstraction in order to evaluate the potential for a security threat. At the middle level of this hierarchy, boolean values called criteria are used to monitor user actions. There is a set of criteria associated with each monitored user and machine. When a criterion is turned on (TRUE), it indicates that a certain condition exists, depending on the meaning established for that criterion. Each criterion is linked to either a single counter gauge, a pair of statistical gauges, or a pair of counter gauges. Each criterion also has an associated threshold value that is used to trigger the criterion.

For example, if the triggered criterion is linked to a counter gauge, it indicates that a certain type of activity occurred and that its occurrence exceeded an established level of concern as defined by its threshold value. If the threshold value was one, then a single occurrence will trigger the criterion. If the threshold value was five, then five occurrences within the specified interval of the gauge will trigger the criterion.

For another example, if the triggered criterion is linked to a pair of statistical gauges, it indicates that a certain type of user activity occurred, that each gauge has a non-zero rate measure over a different time frame, and that the ratio between the gauges has exceeded an established level of concern as defined by its threshold value.

Indicators

Indicators, like criteria, are boolean values that represent an aggregation of information into the highest level of abstraction in the hierarchy. Indicators, like gauges and criteria, are separately associated with users and machines. Thus, each user and machine has its own hierarchical set of gauges, criteria, and indicators. Indicators themselves can actually be related among themselves at several levels of abstraction, but the principle is the same. When an indicator gets triggered, the SI&W Engine 300 produces a warning indicating that a security threat exists. The warning may optionally be configured so that the warning is suppressed. This is useful when a lower level set of indicators is aggregated into a higher level indicator.

Just as with criteria, when an indicator is turned on, it indicates that a certain condition exists, depending on the meaning established for that indicator. Each indicator is associated with one or more criteria (or one or more indicators) and a rule that establishes what combination of criteria (or indicators) would trigger the indicator.

For example, if an indicator is linked to three criteria, the rule might say that the indicator is to be triggered if any two of the three criteria is true. Similarly, it could also say that the indicator would be triggered only if all three criteria are true.

A single criterion can belong to more than one indicator and its associated rule. If that criterion is triggered, it might trigger only one of the indicators, if that indicator's rule were satisfied.

The state of a particular indicator is a function of the state of the set of criteria linked to that indicator. Criteria and indicators are "impermanent" criteria and indicators may be reset when trigger conditions are no longer active. Thus, criteria and indicators can either serve as flags or as state descriptors, e.g., criteria and indicators are something that can be in a boolean state of true or false.

Figure 5:
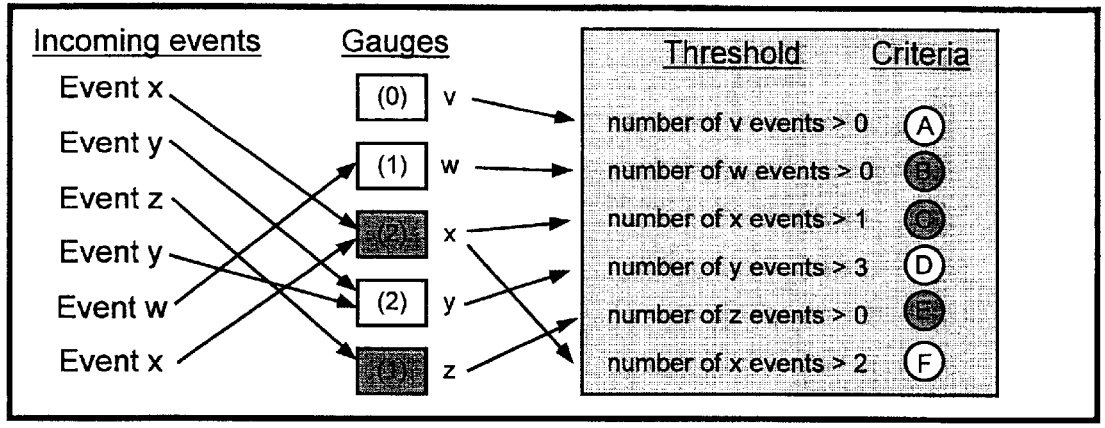
FIGS. 5a, 5b and 5c are illustrations of gauges, criteria and indicators as used in the present invention.
Figure 5:
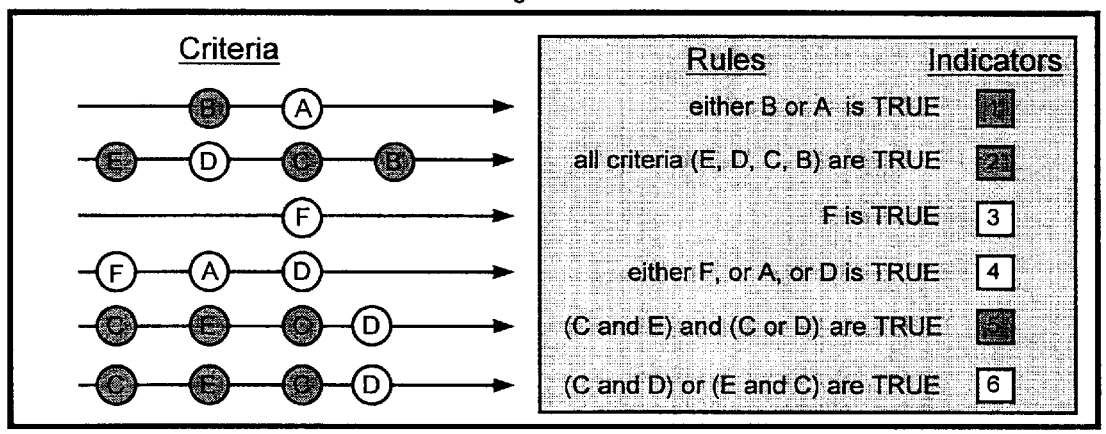
Figure 5:
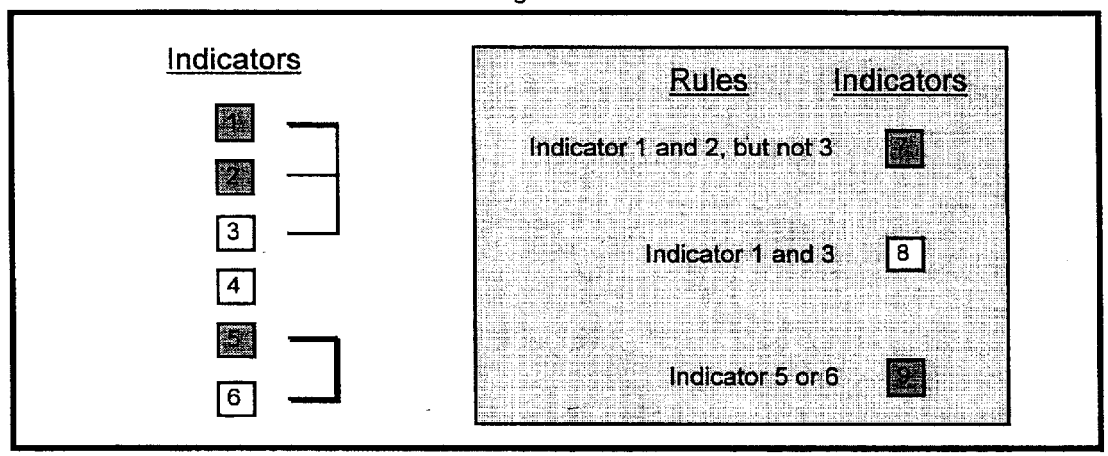

FIG. 5 illustrate the operation of gauges, criteria and indicators for the SI&W Engine 300. As depicted in FIG. 5, audit events representing user activities are input to the SI&W Engine 300. As depicted in FIG. 5a, there are a plurality of counter gauges v, w, x, y, and z, each measuring a specific type of SI&W event. For the purpose of simplification, the figure illustrates the use of counter gauges, but not statistical gauges. In this example, six SI&W events have been received and the appropriate gauges have been incremented to count those events. The figure depicts that no events of type v have been received, one event of type w and z have been received, and two events of type x and y have been received.

FIG. 5a illustrates how incoming events cause criteria to be set. As depicted in that figure, there are six criteria defined, each with an associated gauge and threshold value. For example, the Criteion A is linked to gauge v, with a threshold value of zero. Since no events of that type have been received, the criterion has not been turned on. As another example, the Criterion C is linked to gauge x, with a threshold value of one. Since two events of that type have been received, the Criterion is turned on. This figure illustrates that gauges can have a range of values, including a value of zero, but criteria are boolean values are are either TRUE or FALSE. Each criterion shows that a designated condition exists. For example, Criterion C represents a condition that says more than one event of type x has been received. This figure also illustrates how SI&W events have a one-to-one relationship with gauges, but gauges can have a one-to-many relationship with criteria. The number and configuration of criteria is configurable and can be changed by the ISO.

FIG. 5b illustrates the mapping of criteria into indicators. As with criteria, the indicators are boolean values that can be either TRUE or FALSE. Each indicator represents that a certain condition exists if it is turned on. The condition is a rule that defines a logical relationship between any of the criteria. For examp, Indicator 1 has a rule that says it is turned on when either Criteria B or Criteria A is TRUE. All rules are boolean operations. FIG. 5b illustrates that there is a one-to-many relationship between criteria and indicators.

If a configuration defines more than one level of indicators, then the relationship between indicators in illustrated by FIG. 5c. In this case, there are higher level indicators representing whether a certain condition exists, as defined by the rule associated with that higher level indicator. The rules at this level are also boolean operations.

Anomaly Resolution

Once an anomaly is detected, e.g., an criterion has been turned on, the SI&W Engine 300 attempts to resolve it. As explained above, HADES 308 is notified by the STATS process when the state of a criterion changes. HADES 308 attempts to resolve the meaning of the current state of indicators by evaluating the appropriate subset of the overall rulebase, which consists of a number of individual rules that relate various indicator states with each other and with established threat profiles. Thus the predictive capability of the SI&W Engine 300 is based on the aggregation of data into abstract relationships according to a defined rule set.

While the SI&W Engine 300 is oriented toward the network security problem domain, indicator suites are expected to vary in different monitored networks due to changing threats, operational requirements, policies, as well as due to differences in missions and application environments. The underlying SI&W implementation is designed to support "switchable" indicator suites. The implementation of the SI&W Engine 300 is a distributed rule-based system, where a number of system components are responsible for changing the current state of various criteria, and an expert system is tasked with evaluating, "triggering", and/or setting indicators. The expert system is also responsible for resolving the meaning of indicator sets.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of providing early detection of a potential computer security threat, comprising:

linking together multiple operating system audits into a first related grouping by analyzing and consolidating the system audits, each audit including information about activities on at least one operating system;

linking together multiple operating system audits into a second related grouping by analyzing and consolidating the system audits, each audit including information about activities on operating system;

first determining whether the multiple operating system audits in the first related grouping include activities meeting a first threshold;

second determining whether the multiple operating system audits in the second grouping include activities meeting a second threshold; and if both the first threshold and the second threshold are met, then indicating that a first potential computer security threat exists.

2. The method of claim 1, comprising receiving operating system audits in a standardized format.

3. The method of claim 1, wherein said first grouping is performed during a first time period and said second grouping is performed during a second time period.

4. The method of claim 1, wherein the first threshold includes a predetermined number of failed network logins.

5. The method of claim 1, wherein the second threshold includes a predetermined number of failed host logins.

6. The method of claim 1, wherein the related groupings include at least one field having common information.

7. The method of claim 1, comprising assigning a weight to each of the audits linked into a grouping and for each audit multiplying the weight times the number of occurrences to arrive at a total for each grouping.

8. The method of claim 7, comprising comparing the total against a predetermined threshold to activate a criterion.

9. The method of claim 7
wherein the weight is assigned based on user, host, and network factors.

10. The method of claim 8, comprising
changing weights recorded to a related grouping of activities based upon the total for the related grouping.

11. The method of claim 10, comprising increasing the weights accorded to a related grouping of activities based upon the total for the related grouping being above a predetermined threshold.

12. The method of claim 10, comprising decreasing the weights accorded to a related grouping of activities based upon the total for the related grouping being below a predetermined threshold.

13. The method of claim 7, comprising
counting number of occurrences of a particular activity over a period of time and adjusting weights in accordance with predetermined values.

14. The method of claim 7, comprising
reducing the weight accorded to an activity based upon the amount of time elapsed since the activity occurred.

15. The method of claim 14, wherein the weight is adjusted by a straight line formula.

16. The method of claim 14, wherein the weight is adjusted by an exponential formula.

17. The method of claim 1, comprising:
linking together multiple operating system audits into a third related grouping by analyzing and consolidating the system audits, each audit including information about activities on at least one operating system;
linking together multiple operating system audits into a fourth related grouping by analyzing and consolidating the system audits, each audit including information about activities on at least one operating system;
third determining whether the multiple operating system audits in the third related grouping include activities meeting a third threshold;
fourth determining whether the multiple operating system audits in the fourth grouping include activities meeting a fourth threshold;
if both the third and the fourth thresholds are met, then indicating that a second potential computer security threat exists; and
if both the first and a second potential security threats exist then providing an additional indication that a heightened computer security threat exists.

18. An article, comprising:
at least one sequence of machine executable instructions;
a medium bearing the executable instructions in machine readable form,
wherein execution of the instructions by one or more processors causes the one or more processors to:
link together multiple operating system audits into a first related grouping by analyzing and consolidating the system audits, each audit including information about activities on at least one operating system;
link together multiple operating system audits into a second related grouping by analyzing and consolidating the system audits, each audit including information about activities on operating system;
first determine whether the multiple operating system audits in the first related grouping include activities meeting a first threshold;
second determine whether the multiple operating system audits in the second grouping include activities meeting a second threshold; and
if both the first threshold and the second threshold are met, then indicate that a first potential computer security threat exists.

19. A computer architecture, comprising:
linking means for linking together multiple operating system audits into a first related grouping by analyzing and consolidating the system audits, each audit including information about activities on at least one operating system;
linking means for linking together multiple operating system audits into a second related grouping by analyzing and consolidating the system audits, each audit including information about activities on operating system;
first determining means for determining whether the multiple operating system audits in the first related grouping include activities meeting a first threshold;
second determining means for determining whether the multiple operating system audits in the second grouping include activities meeting a second threshold; and
if both the first threshold and the second threshold are met, the means indicate that a first potential computer security threat exists.

20. A computer system, comprising:
a processor; and a
memory coupled to said processor, the memory having stored therein sequences of instructions, which, when executed by said processor, cause said processor to perform the steps of:
linking together multiple operating system audits into a first related grouping by analyzing and consolidating the system audits, each audit including information about activities on at least one operating system;
linking together multiple operating system audits into a second related grouping by analyzing and consolidating the system audits, each audit including information about activities on operating system;
first determining whether the multiple operating system audits in the first related grouping include activities meeting a first threshold;
second determining whether the multiple operating system audits in the second grouping include activities meeting a second threshold;
and if both the first threshold and the second threshold are met, then indicating that a first potential computer security threat exists.

21. A method of providing early detection of a potential computer security threat, comprising:
- linking together multiple operating system audits into a first related grouping, each audit including information about activities on at least one operating system;
- linking together multiple operating system audits into a second related grouping, each audit including information about activities on operating system;
- first determining whether the multiple operating system audits in the first related grouping include activities meeting a first threshold;
- second determining whether the multiple operating system audits in the second grouping include activities meeting a second threshold; and
- if both the first threshold and the second threshold are met, then indicating that a first potential computer security threat exists,
- assigning a weight to each of the audits linked into a grouping and for each audit multiplying the weight times the number of occurrences to arrive at a total for each grouping,
- wherein the weight is assigned based on user, host, and network factors.

22. A method of providing early detection of a potential computer security threat, comprising:
- linking together multiple operating system audits into a first related grouping, each audit including information about activities on at least one operating system;
- linking together multiple operating system audits into a second related grouping, each audit including information about activities on operating system;
- first determining whether the multiple operating system audits in the first related grouping include activities meeting a first threshold;
- second determining whether the multiple operating system audits in the second grouping include activities meeting a second threshold; and
- if both the first threshold and the second threshold are met, then indicating that a first potential computer security threat exists,
- assigning a weight to each of the audits linked into a grouping and for each audit multiplying the weight times the number of occurrences to arrive at a total for each grouping,
- wherein counting number of occurrences of a particular activity over a period of time and adjusting weights in accordance with predetermined values.

23. An article, comprising:
- at least one sequence of machine executable instructions;
- a medium bearing the executable instructions in machine readable form,
- wherein execution of the instructions by one or more processors causes the one or more processors to:
- link together multiple operating system audits into a first related grouping, each audit including information about activities on at least one operating system;
- link together multiple operating system audits into a second related grouping, each audit including information about activities on operating system;
- first determine whether the multiple operating system audits in the first related grouping include activities meeting a first threshold;
- second determine whether the multiple operating system audits in the second grouping include activities meeting a second threshold; and
- if both the first threshold and the second threshold are met, then indicate that a first potential computer security threat exists,
- assigning a weight to each of the audits linked into a grouping and for each audit multiplying the weight times the number of occurrences to arrive at a total for each grouping,
- wherein the weight is assigned based on user, host, and network factors.

24. An article, comprising:
- at least one sequence of machine executable instructions;
- a medium bearing the executable instructions in machine readable form,
- wherein execution of the instructions by one or more processors causes the one or more processors to:
- link together multiple operating system audits into a first related grouping, each audit including information about activities on at least one operating system;
- link together multiple operating system audits into a second related grouping, each audit including information about activities on operating system;
- first determine whether the multiple operating system audits in the first related grouping include activities meeting a first threshold;
- second determine whether the multiple operating system audits in the second grouping include activities meeting a second threshold; and
- if both the first threshold and the second threshold are met, then indicate that a first potential computer security threat exists,
- assigning a weight to each of the audits linked into a grouping and for each audit multiplying the weight times the number of occurrences to arrive at a total for each grouping,
- wherein counting number of occurrences of a particular activity over a period of time and adjusting weights in accordance with predetermined values.

25. A computer architecture, comprising:
- linking means for linking together multiple operating system audits into a first related grouping, each audit including information about activities on at least one operating system;
- linking means for linking together multiple operating system audits into a second related grouping, each audit including information about activities on operating system;
- first determining means for determining whether the multiple operating system audits in the first related grouping include activities meeting a first threshold;
- second determining means for determining whether the multiple operating system audits in the second grouping include activities meeting a second threshold; and
- if both the first threshold and the second threshold are met, the means indicate that a first potential computer security threat exists,
- assigning a weight to each of the audits linked into a grouping and for each audit multiplying the weight times the number of occurrences to arrive at a total for each grouping,
- wherein the weight is assigned based on user, host, and network factors.

26. A computer architecture, comprising:
- linking means for linking together multiple operating system audits into a first related grouping, each audit including information about activities on at least one operating system;

linking means for linking together multiple operating system audits into a second related grouping, each audit including information about activities on operating system;

first determining means for determining whether the multiple operating system audits in the first related grouping include activities meeting a first threshold;

second determining means for determining whether the multiple operating system audits in the second grouping include activities meeting a second threshold; and if both the first threshold and the second threshold are met, the means indicate that a first potential computer security threat exists, assigning a weight to each of the audits linked into a grouping and for each audit multiplying the weight times the number of occurrences to arrive at a total for each grouping, wherein counting number of occurrences of a particular activity over a period of time and adjusting weights in accordance with predetermined values.

27. A computer system, comprising:

a processor; and a memory coupled to said processor, the memory having stored therein sequences of instructions, which, when executed by said processor, cause said processor to perform the steps of:

linking together multiple operating system audits into a first related grouping, each audit including information about activities on at least one operating system;

linking together multiple operating system audits into a second related grouping, each audit including information about activities on operating system;

first determining whether the multiple operating system audits in the first related grouping include activities meeting a first threshold;

second determining whether the multiple operating system audits in the second grouping include activities meeting a second threshold;

and if both the first threshold and the second threshold are met, then indicating that a first potential computer security threat exists, assigning a weight to each of the audits linked into a grouping and for each audit multiplying the weight times the number of occurrences to arrive at a total for each grouping, wherein counting number of occurrences of a particular activity over a period of time and adjusting weights in accordance with predetermined values.

* * * * *